United States Patent [19]

Maghon

[11] Patent Number: 5,735,115
[45] Date of Patent: Apr. 7, 1998

[54] GAS TURBINE COMBUSTOR WITH MEANS FOR REMOVING SWIRL

[75] Inventor: Helmut Maghon, Mülheim/Ruhr, Germany

[73] Assignee: Siemens Aktiengesellschaft, Munich, Germany

[21] Appl. No.: 682,755

[22] Filed: Jul. 23, 1996

Related U.S. Application Data

[63] Continuation of PCT/EP95/00245, Jan. 24, 1995.

[30] Foreign Application Priority Data

Jan. 24, 1994 [EP] European Pat. Off. ............ 94100988
Jan. 24, 1994 [EP] European Pat. Off. ............ 94100989

[51] Int. Cl.⁶ .................................................. F23R 3/04
[52] U.S. Cl. .................... 60/39.36; 60/39.826; 60/746
[58] Field of Search ........................... 60/39.11, 39.36, 60/39.826, 722, 746, 747, 748, 751

[56] References Cited

U.S. PATENT DOCUMENTS

| Re. 33,896 | 4/1992 | Maghon et al. . | |
|---|---|---|---|
| 3,019,606 | 2/1962 | Franz . | |
| 3,433,015 | 3/1969 | Sneeden . | |
| 3,460,345 | 8/1969 | Greenwood . | |
| 3,793,828 | 2/1974 | Chesters | 60/748 |
| 3,879,939 | 4/1975 | Markowski . | |
| 4,052,844 | 10/1977 | Caruel et al. . | |
| 4,100,732 | 7/1978 | Bryans et al. | 60/39.36 |
| 4,194,359 | 3/1980 | Brookman et al. . | |
| 4,749,029 | 6/1988 | Becker et al. . | |
| 5,058,375 | 10/1991 | Shekelton et al. | 60/39.36 |
| 5,207,064 | 5/1993 | Ciokajlo et al. . | |
| 5,211,003 | 5/1993 | Samuel . | |

FOREIGN PATENT DOCUMENTS

| 0 193 838 | 2/1986 | European Pat. Off. . |
|---|---|---|
| 0 224 817 | 11/1986 | European Pat. Off. . |
| 0 489 193 | 12/1990 | European Pat. Off. . |
| 0 483 554 | 10/1991 | European Pat. Off. . |
| 2 245 855 | 5/1974 | France . |
| 2 345 592 | 3/1977 | France . |
| 2 037 419 | 11/1979 | Germany . |
| 0 816 878 | 4/1957 | United Kingdom . |

*Primary Examiner*—Louis J. Casaregola
*Attorney, Agent, or Firm*—Bardehle, Pagenberg, Dost, Altenburg, Frohwitter, Ceissler

[57] ABSTRACT

The invention relates to a combustion chamber (6) for a gas turbine (6, 18, 19) through which a flow (2) of compressed air is allowed to pass, flowing along an axis (3) from a compressor part (18) to a turbine part (19), said flow (2) having a swirl relative to the axis (3). In this arrangement, an annular passage (4) is provided at the inlet of the combustion chamber (6) having an inflow part (8) for separating a partial flow (1) from the flow (2), which comprises means (11) for removing the swirl from the partial flow (1), and which communicates with the cooling passages (14) for cooling the combustion chamber (6) as well as with pilot burners (7) for stabilizing combustion in the combustion chamber (6). The combustion chamber (6) is configured in an especially favorable manner with regard to avoiding thermodynamic losses and permits the separation of a partial flow (1) which is outstandingly suitable both for cooling purposes and for stabilizing purposes.

14 Claims, 3 Drawing Sheets

GAS TURBINE COMBUSTOR WITH MEANS FOR REMOVING SWIRL

CONTINUATION STATEMENT

This application is a continuation of International Application No. PCT/EP95/00245, filed 24 Jan. 1995, still pending.

BACKGROUND OF THE INVENTION

The invention relates to a combustion chamber for a gas turbine through which a flow of compressed air is allowed to pass, flowing from a compressor part to a turbine part along an axis, the flow having a swirl or angular momentum, respectively, relative to the axis.

The invention particularly relates to the provision of a partial flow from the flow in order to use this partial flow for further purposes for the operation of the gas turbine. A known application for such a partial flow is the cooling of the turbine part as well as the cooling of a combustion chamber arranged between the compressor part and the turbine part and passed through by the flow. In a conventional stationary gas turbine for generating electricity at an output of 100 MW and above, such an arrangement is necessary because prior to entering the turbine part, the flow is heated by the combustion of fuel to a temperature of more than 1000° C. and thus, structural parts of the turbine part and other components of the gas turbine are subjected to a high thermal load. Without cooling, such high thermal load may not be coped with. Preferably air bled from the flow is used as coolant. It has also already been proposed to mix this air with other substances, in particular with water vapor.

Since the systems for guiding the air bled for cooling are often branched and the pressure loss which the main portion of compressed air used for combustion sustains in a combustion chamber, is normally kept at a low level for reasons of guaranteeing a high thermodynamic efficiency, a possibility has to be provided for increasing the static pressure of the bled air. As a matter of course, a blower or a compressor can be used therefor, this however, constitutes a considerable mount of equipment and a loss of net efficiency, because the power for operating a blower or compressor must ultimately be supplied by the gas turbine itself and thus is no longer available for being fed into a power supply network. On principle, it is therefore desirable to avoid the use of a blower or compressor.

General information on the construction of burners and combustion chambers for gas turbines including hot gas passages connecting such combustion chambers to turbine parts are described in EP 0 193 838 B1, U.S. Pat. No. Re. 33896, EP 0 224 817 B1, U.S. Pat. No. 4,749,029, EP 0 483 554 A1 and EP 0 489 193 A1. The last-mentioned document relates to a combustion chamber for a gas turbine in the form of a so-called, annular combustion chamber and also gives information on the cooling of structural parts of this annular combustion chamber.

The cooling of parts of a rotor of a gas turbine by means of a partial flow of air is described in EP 0 447 886 A1.

U.S. Pat. No. 5,207,064 discloses an arrangement having a combustion chamber for a gas turbine. The arrangement comprises the actual combustion chamber as well as devices which are allocated to the combustion chamber and bleed partial flows from the flow of compressed air passing through the combustion chamber. These partial flows are partly supplied to so-called pilot burners which in each one of these partial flows burn a small portion of the total amount of fuel supplied and stabilize a combustion taking place at another point in the flow and for which the predominant portion of the fuel is fed. Other partial flows bled at another point serve for cooling the combustion chamber. The partial flows are each bled from the flow near those points where they are used as intended; for the pilot burners, the partial flows are bled in the inflow area of the arrangement, for cooling an outer wall of the combustion chamber, the bleeding is effected near the outer wall, and for cooling the inner wall of the combustion chamber, the bleeding of the partial flows is effected near this inner wall. The combustion chamber itself is of an annular design and surrounds a rotor of the gas turbine, which connects the turbine part downstream of the combustion chamber to the compressor part upstream of the combustion chamber.

SUMMARY OF THE INVENTION

The object of the invention is to provide a combustion chamber of the type described above, wherein means being of simple design and requiring little effort are provided for bleeding partial flows and which can remain largely free of additional built-in components, in order to guide the flow as free of losses as possible.

To achieve this object, a combustion chamber for a gas turbine is provided through which a flow of compressed air is allowed to pass, flowing along an axis from a compressor part to a turbine part, the flow comprising a swirl relative to the axis, the combustion chamber having at an inlet an annular passage with an inflow part for separating a partial flow from the flow, and the inflow part having means for removing the swirl from the partial flow and communicating with cooling passages for cooling the combustion chamber as well as with pilot burners for stabilizing combustion in the combustion chamber.

According to the invention, the many different means for separating partial flows from the flow are combined in a single inflow part provided at the inlet of the combustion chamber in which; by removing the swirl and by a decelerating associated therewith, a partial flow of increased static pressure is provided, which communicates via corresponding devices with the cooling passages for cooling the combustion chamber as well as with the pilot burners for stabilizing the combustion process in the combustion chamber. In addition, the combustion chamber can remain free of built-in components, except for those built-in components which are required for supplying fuel to the flow, where applicable. Furthermore, the flow is allowed to pass to a large extent freely through the combustion chamber, so that thermodynamic losses are avoided to a large extent.

It is understood that the removal of the swirl of the partial flow branched according to the invention is not effected by dissipation, that is, by friction, but by mainly avoiding turbulences by deflection in order to obtain as large an increase of the static pressure in the partial flow as possible and thus benefit as far as possible from the advantages resulting therefrom. Preferably, the partial flow represents a portion of the flow passing through a ring-shaped section of the annular passage, because in this way it is ensured that no swirl is lost during the separation. The connection of the correspondingly designed inflow part to the cooling passages is preferably realized by appropriate tubes.

The means for removing the swirl from the partial flow are preferably guide blades correspondingly designed and arranged.

Furthermore, ribs are preferably provided for supplying fuel to the flow which are arranged such that fuel, Which is supplied thereby to the flow, is ignited at pilot flames provided by the pilot burners. A corresponding fuel pipe system is provided for supplying fuel to both the pilot burners and the ribs. Within the framework of this embodiment, the number of pilot burners preferably corresponds to half the number of ribs or to the entire number of ribs. This results in an allocation of one pilot burner each to every rib or one pilot burner each to two ribs, which allocation, through appropriately positioning the pilot burner and the rib or ribs, respectively, relative to each other, can be utilized in such a way that a particularly high concentration of fuel is obtained in the flow in the area of the pilot flame delivered by the pilot burner, which contributes to an increased ignitibility of the fuel/air mixture and thus to a stabilization of the combustion.

A further embodiment of the kind just described is characterized in that the combustion chamber is attached to a turbine part which has to be subjected to a flow through a ring of guide blades, the number of ribs being equal to the number of guide blades. Upon suitably positioning the ribs and the guide blades relative to each other, this embodiment enables the local maxima of the temperature distribution in the flow resulting from inhomogeneity in the supply of fuel to the flow, to be located each between two guide blades so that the temperature, which a guide blade is subjected to, is significantly below the temperature occurring in the flow. In this way, at a deliberately inhomogeneous supply of fuel in a correspondingly adjusted arrangement, an increase in the thermodynamically relevant average temperature of the flow can be achieved by deliberately increasing the maximum of the distribution of temperature without increasing the thermal load of the guide blades. Thus, the invention provides the possibility of increasing the thermodynamic efficiency of a gas turbine.

The combustion chamber provided with ribs for supplying fuel is preferably free of further built-in components, so as to allow the flow to pass through the combustion chamber as free of disturbances as possible. In a special way, this combustion chamber avoids thermodynamic losses which otherwise could result in turbulences and/or on complicated built-in components, and is therefore of great advantage with regard to achieving a high efficiency.

BRIEF DESCRIPTION OF THE FIGURES

Embodiments of the invention are apparent from the drawing. In each figure of the drawing, only those elements of the embodiments are shown which are of importance for the explanation. Elements corresponding to each other are given the same reference numerals. The drawing is partly schematically carried out and/or made slightly out of shape and particularly is not intended to be considered as a reproduction to scale of a concrete embodiment. In detail.

DETAILED DESCRIPTION OF THE INVENTION

Figure 1:
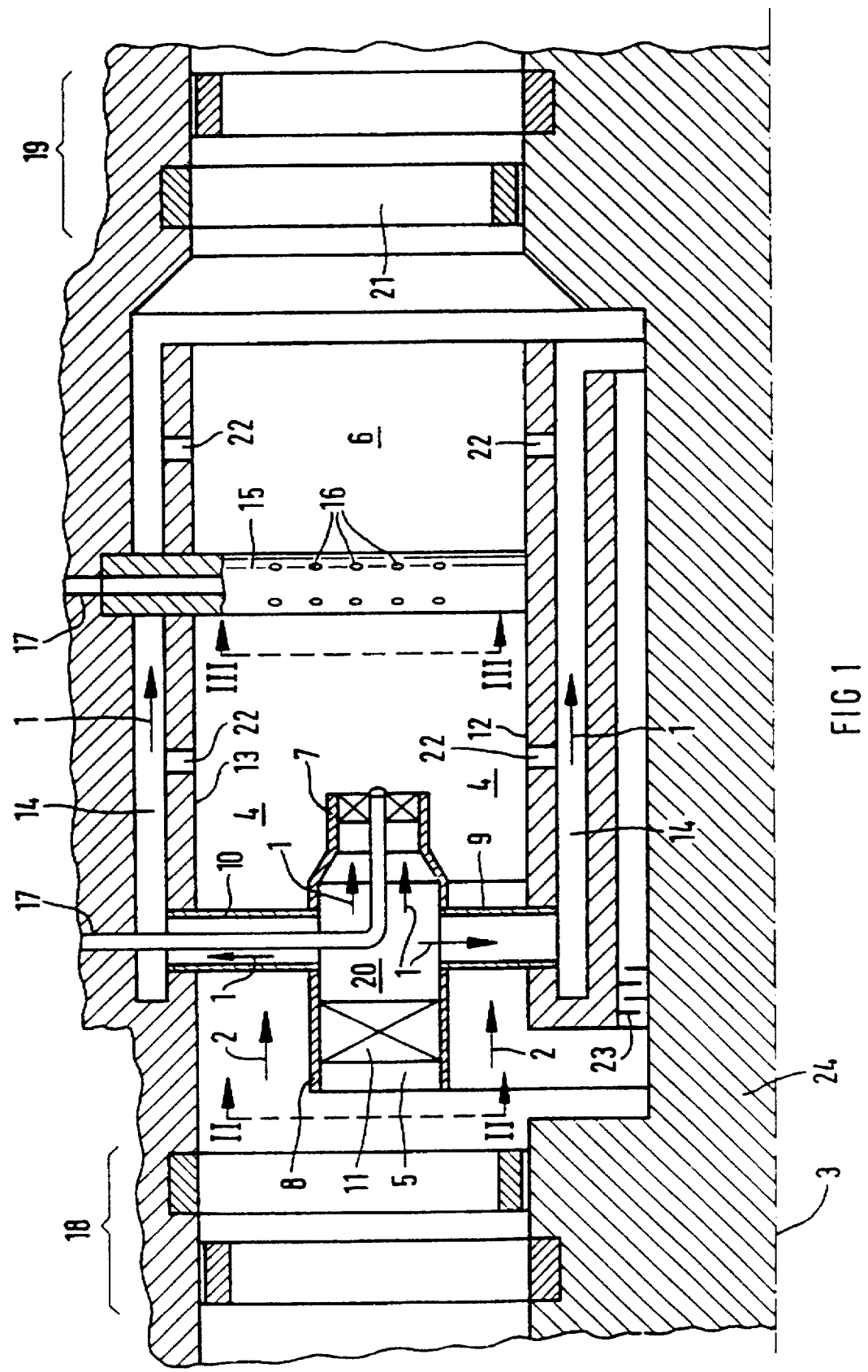
FIGS. 1, 2 and 3 show views of a combustion chamber in a gas turbine.
Figure 2:
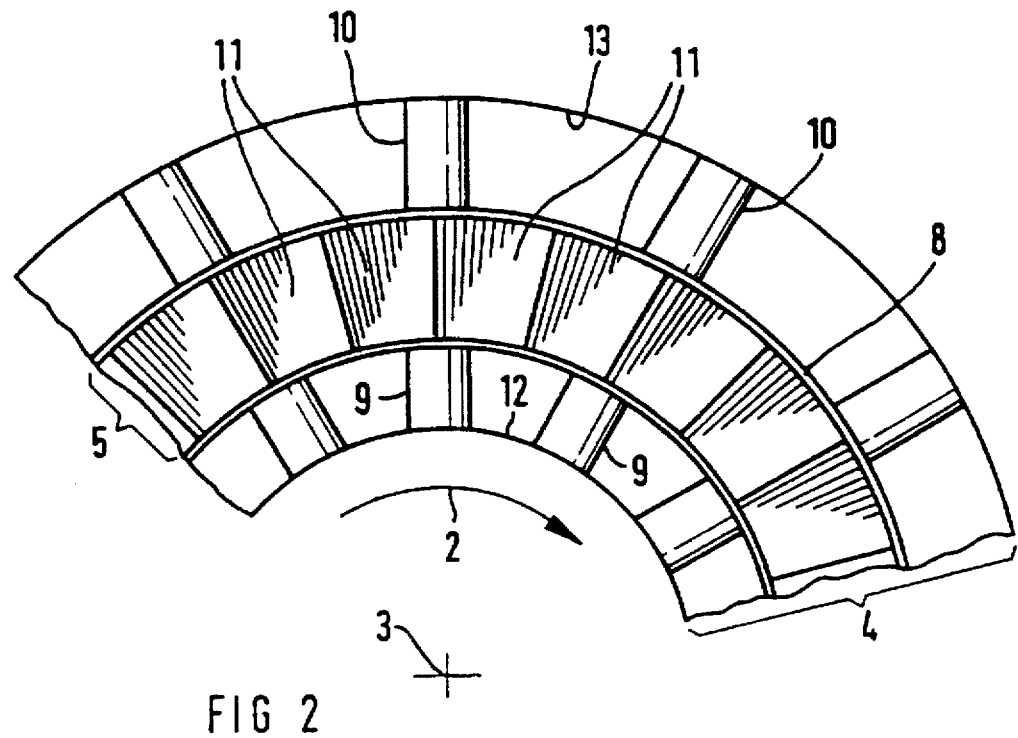
Figure 3:
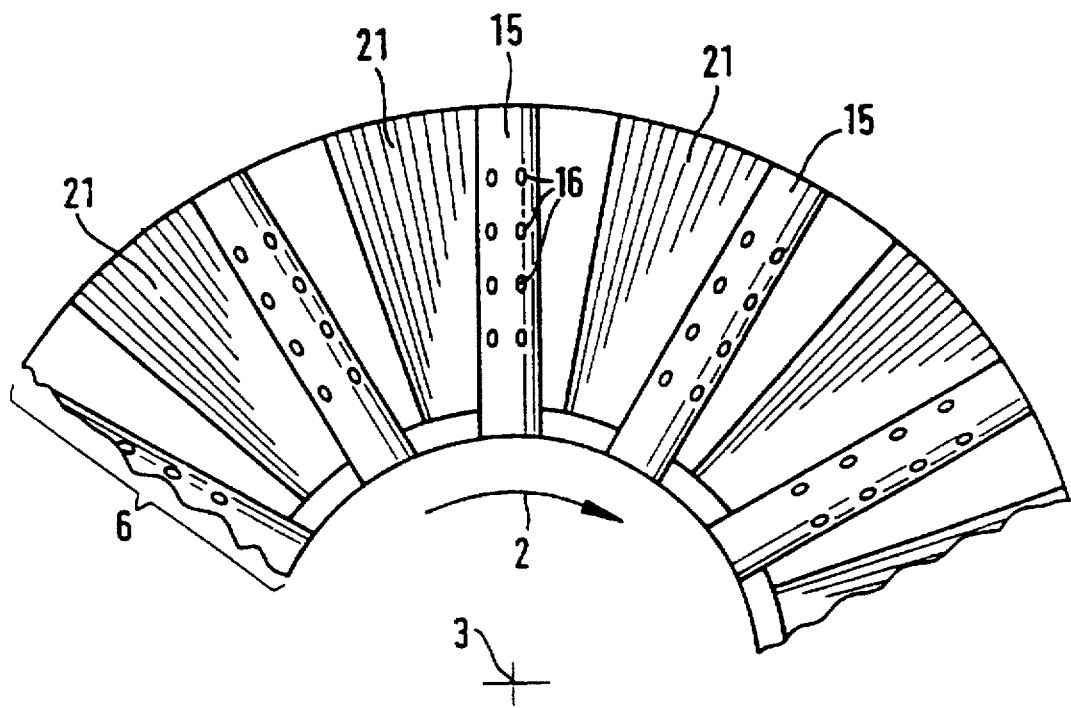

FIG. 1 shows a detail of a gas turbine, namely a portion of the compressor part 18, a portion of the turbine part 19 and, lying therebetween, a combustion chamber 6 in the form of an annular combustion chamber. The arrangement is axially symmetrical with regard to the axis 3. The compressor part 18 supplies a flow 2 of compressed gas, namely compressed air, which propagates helically along the axis 3 and accordingly comprises a swirl relative to the axis 3. This is indicated in FIGS. 2 and 3. The major portion of the flow 2 enters the combustion chamber 6, a partial flow 1 being bled therefrom in an annular passage 4 at the inlet of the combustion chamber 6. In a ring-shaped section 5 of the annular passage 4, this partial flow 1 enters an inflow part 8 and there at first flows against guide blades 11, which substantially remove the swirl therefrom. Downstream of the guide blades 11, the partial flow 1 enters a collecting space 20 in a way substantially parallel to the axis 3 and is supplied therefrom to several applications. Through an outwardly directed tube 10, a portion of the partial flow 1 passes into a cooling passage 14 behind the outside 13 of the annular passage 4 and thus is capable of cooling the combustion chamber 6; thereby, it passes partly through cooling air bores 22 back into the combustion chamber 6 and is partly mixed again with the flow 2 downstream of the combustion chamber 6. Another portion of the partial flow 1 advances through an inwardly directed tube 9 behind the inside 12 of the annular passage 4, and there likewise passes into a cooling passage 14, where it cools the combustion chamber 6. Downstream of the combustion chamber 6, it again partly reaches the flow 2; other portions pass directly into the combustion chamber 6 through cooling air bores 22 present at the inside 12. A further portion of the partial flow 1 passes to a pilot burner 7 and is mixed there with fuel which is supplied via a fuel pipe system 17. This pilot burner 7 serves a certain preparatory heating-up of the flow and stabilizes the combustion in the combustion chamber 6 which delivers the main amount of heat to be supplied to the flow 2. The combustion in the combustion chamber 6 is realized by fuel supplied via the fuel pipe system 17 to a rib 15 inserted into the combustion chamber 6 from where it passes into the flow 2 through nozzles 16. The combustion is realized in the combustion chamber 6 upon maintaining the swirl of the flow 2 from which various advantages with regard to the thermodynamic efficiency of the gas turbine result. At its end facing the combustion chamber 6, the turbine part 19 has fixed guide blades 21 which always belong to the components of the gas turbine subjected to the highest thermal load and in practice often require cooling in the same way as the combustion chamber 6. For this purpose too, a partial flow 1 separated from the flow 2 may be used; a corresponding representation in FIG. 1 has been omitted for reasons of clarity. For the design of the cooling systems for guide blades 21 and other components of the turbine part 19, reference be made to the cited documents of the prior art as well as to the relevant technical knowledge. The combustion chamber 6 surrounds the rotor 24 of the gas turbine. Located between the combustion chamber 6 and the rotor 24 is a sealing arrangement 23, for example a labyrinth seal, which ensures that the flow 2 completely passes to the combustion chamber 6.

FIG. 2, as indicated by line II—II in FIG. 1, shows a front view of the inflow part 8. The swirl of the flow 2 is shown by the curved arrow. The axis 3 appears as a cross. The inflow part 8 can clearly be recognized to cover a ring-shaped section 5 of the annular passage 4. Also recognizable are the guide blades 11 which are oriented in such a way that, for increasing the static pressure, they reduce, preferably remove to a large extent, the swirl of the partial flow 1 passing into the inflow part 8. Also recognizable are the inwardly and outwardly directed tubes 9 and 10 through which portions of the partial flow 1 pass to their respective destinations, particularly to cooling passages 14 for the combustion chamber 6 as already explained.

FIG. 3, in accordance with line III—III in FIG. 1, shows a cross-section through the combustion chamber 6 perpendicular to the axis 3. Here too, the curved arrow symbolizes the swirl of the flow 2. The ribs 15 having nozzles 16 as well as the guide blades 21 which already belong to the turbine part 19 can be recognized. Number and arrangement of the ribs 15 and guide blades 21 are matched to each other in order to keep thermal load caused on the guide blades 21 by the flow 2 at a low level, which, due to the selected geometry of the ribs 15, is non-uniformly heated.

Figure 4:
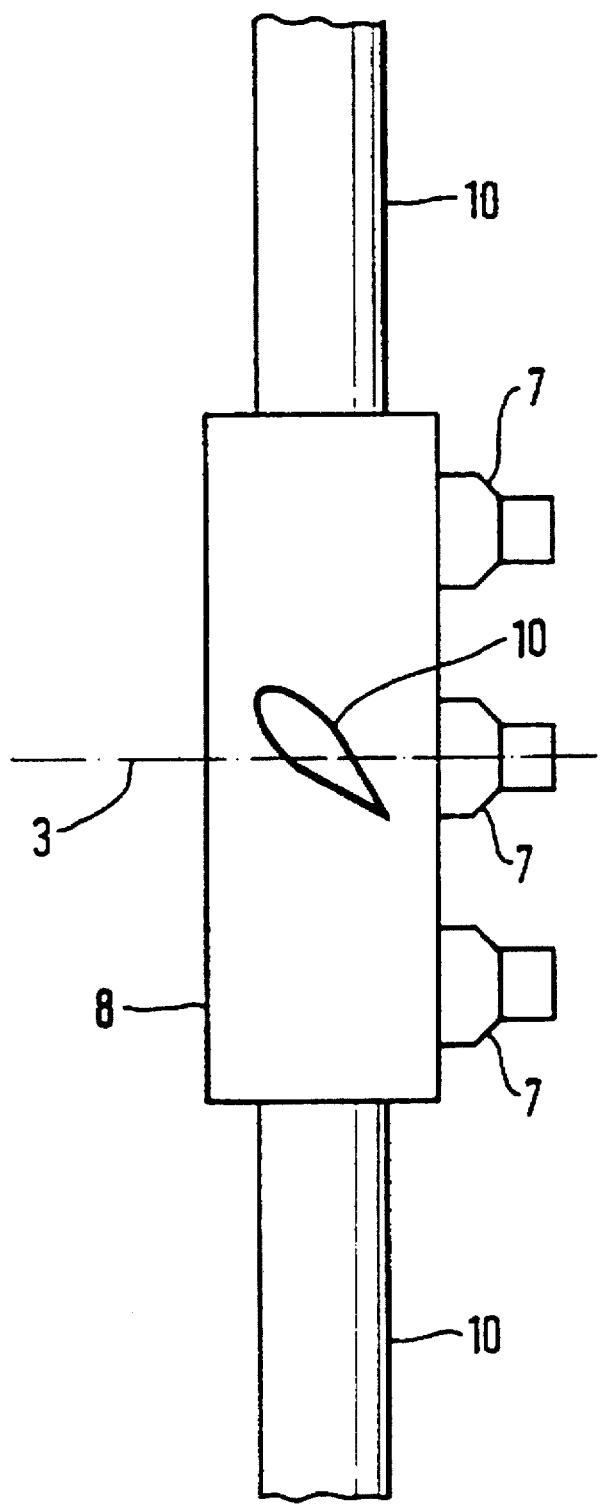
FIG. 4 shows a view of a particularly preferred embodiment of the combustion chamber.

FIG. 4 shows a view of the inflow part 8 together with outwardly directed tubes 10 as well as pilot burners 7 in a view perpendicular to the axis 3. It can clearly be recognized that each tube 10 has a profile of flattened cross-section; the profile is oriented such that it offers as little resistance as possible to the flow 2 passing helically around the axis 3.

The invention relates to a combustion chamber for a gas turbine which is designed to have as disturbance-free and low-loss guidance as possible of the flow of compressed air passing therethrough, and which enables a partial flow to be separated from the flow, which partial flow is influenced such that it is outstandingly suited for many different purposes, in particular for cooling purposes and for stabilizing purposes.

I claim:

1. A combustion chamber (6) for a gas turbine (6, 18, 19) through which a flow (2) of compressed air is allowed to pass, flowing along an axis (3) from a compressor part (18) to a turbine part (19), said flow (2) having a swirl relative to the axis (3), said chamber comprising: an annular passage (4) at an inlet of the combustion chamber (6) having an inflow part (8) for separating a partial flow (1) from the flow (2), wherein the inflow part (8) comprises means (11) for removing said swirl from the partial flow (1), wherein said means (11) for removing communicates with cooling passages (14) for cooling the combustion chamber (6) and also communicates with pilot burners (7) for stabilizing combustion in the combustion chamber (6).

2. The combustion chamber (6) according to claim 1, wherein the inflow part (8) extends over a ring-shaped partial section (5) of the annular passage (4) and is connected to the cooling passages (14) by tubes (9, 10).

3. The combustion chamber (6) according to claim 1, wherein the means (11) for removing the swirl from the partial flow (1) comprises guide blades (11).

4. The combustion chamber (6) according to claim 2, wherein the means (11) for removing the swirl from the partial flow (1) comprises guide blades (11).

5. The combustion chamber (6) according to claim 1, further comprising ribs (15) for supplying fuel to the flow (2), said fuel being ignited and burnt at pilot flames delivered by the pilot burners (7), and a fuel pipe system (17) for supplying fuel to both the pilot burners (7) and the ribs (15).

6. The combustion chamber (6) according to claim 5, wherein the number of pilot burners (7) corresponds to half the number of ribs (15).

7. The combustion chamber (6) according to claim 5, wherein the number of pilot burners (7) corresponds to the entire number of ribs (15).

8. The combustion chamber (6) according to claim 6, further comprising a turbine part (19) for being subjected to a flow and having a ring of guide blades (21), the number of ribs (15) being equal to the number of guide blades (21).

9. The combustion chamber (6) according to claim 7, further comprising a turbine part (19) for being subjected to a flow and having a ring of guide blades (21), the number of ribs (15) being equal to the number of guide blades (21).

10. The combustion chamber (6) according to claim 5, wherein the ribs (15) are the only obstructions downstream of the annular passage (4).

11. A combustion chamber (6) for a gas turbine (6, 18, 19) through which a flow (2) of compressed air is allowed to pass, flowing along an axis (3) from a compressor part (18) to a turbine part (19), said flow (2) having a swirl relative to the axis (3), said chamber comprising: an annular passage (4) at an inlet of the combustion chamber (6) having an inflow part (8) for separating a partial flow (1) from the flow (2), wherein the inflow part (8) comprises a flow guide for removing said swirl from the partial flow (1), wherein said flow guide communicates with cooling passages (14) for cooling the combustion chamber (6) and also communicates with pilot burners (7) for stabilizing combustion in the combustion chamber (6).

12. The combustion chamber (6) according to claim 11, wherein the inflow part (8) extends over a ring-shaped partial section (5) of the annular passage (4) and is connected to the cooling passages (14) by tubes (9, 10).

13. The combustion chamber (6) according to claim 11, wherein the flow guide for removing the swirl from the partial flow (1) comprises guide blades (11).

14. The combustion chamber (6) according to claim 12, wherein the flow guide for removing the swirl from the partial flow (1) comprises guide blades (11).

* * * * *